April 20, 1965 R. TOUVAY 3,179,732
ELECTRODE
Filed July 25, 1962
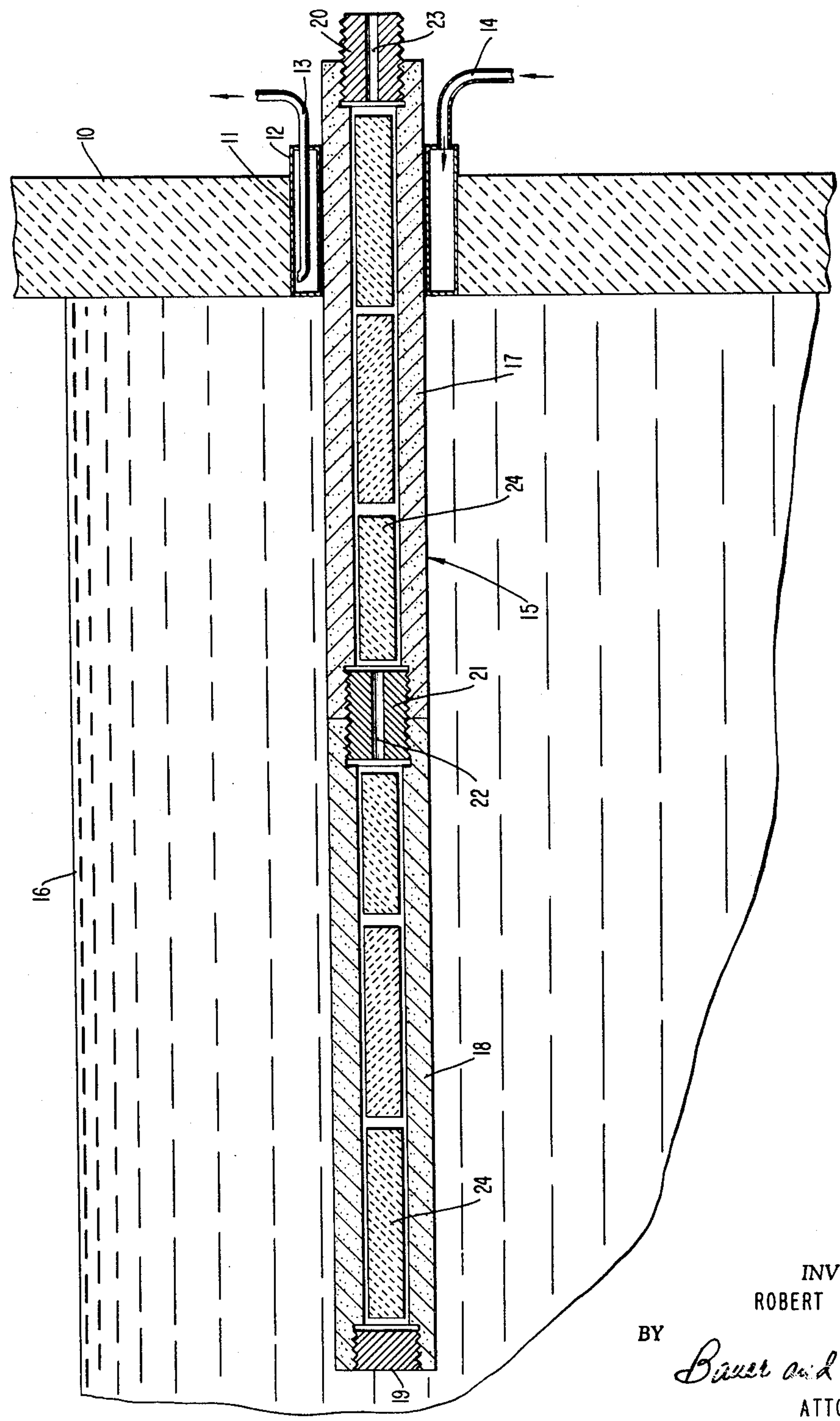
INVENTOR.
ROBERT TOUVAY
BY Bauer and Seymour
ATTORNEYS

United States Patent Office 3,179,732

Patented Apr. 20, 1965

3,179,732

ELECTRODE

Robert Touvay, Paris, France, assignor to Compagnie de Saint-Gobain, Neuilly-sur-Seine (Seine), France Filed July 25, 1962, Ser. No. 212,265
Claims priority, application France, July 31, 1961, 869,515
8 Claims. (Cl. 13—6)

This invention relates to the improvement of electrodes for glass furnaces which operate by joule effect. The invention is particularly related to the improvement of graphite electrodes which penetrate horizontally into furnaces containing dense molten masses.

In existing practice, some electric glass furnaces have graphite electrodes which penetrate through the opposite side walls of a glass furnace into endwise proximity, and others have electrodes extending wholly or partly across the furnace. Some of the electrodes are so long that they have been made of sections joined together, for instance by screw threads oppositely turned into the surfaces of plugs which are received in threaded recesses in the ends of the electrode sections, so that assembling the parts provides the electrode with a substantially smooth exterior.

Graphite electrodes are not of great strength and are sometimes known to break under the conditions of use before a normal period of service has been attained. Replacement is arduous and costly, and it is an object of this invention to determine the cause of premature breakage and to remedy it. Another object is to improve the life span of such electrodes by prolonging their usefulness.

I have discovered that the difference in the density of the molten glass and the graphite electrode introduces mechanical fatigue within the electrode and that the forces involved are sufficient, considering the strength of the graphite either as a single or composite piece, to cause breakage. This fatigue is the greater as the electrode is the longer, measured from the place of support in the furnace wall. The fatigue occurs, followed by premature breakage, most frequently near the place of support, and sometimes near the joints of jointed electrodes.

Other objects of the invention are to reduce or eliminate electrode fatigue, to reduce breakage, to reduce the costs of repair and replacement, and to maintain furnaces at maximum efficiency for longer periods of time.

The objects are accomplished, generally speaking, by an electrode for a glass furnace comprising a tube of graphite containing a longitudinally extending filler of denser refractory material, the apparent density of the tube and filler being substantially equal to the density of molten glass.

In accordance with the invention the electrodes are hollowed out, at least in the part which is to be in the glass and the space is filled with a refractory of density greater than that of the glass bath, so that the apparent density of the resulting piece will be substantially the same as that of the glass, or, if upon eventual breaking it is desired that the broken piece float, so that the apparent density is slightly less than that of the bath. On the other hand, if it be desired that the electrode sink when broken, the apparent density can be established as slightly more than that of the bath.

In making window glass having the composition

| | Pts. by wt. |
|---|---|
| $SiO_2$ | about 72.70 |
| $Fe_2O_3$ | 0.10 |
| $Al_2O_3$ | 1.30 |
| CaO | 8.40 |
| MgO | 3.60 |
| $Na_2O$ | 13.43 |
| $K_2O$ | 0.19 |
| $SO_3$ | 0.28 |

which produces molten glass with a density about 2.30 at 1500° C., one may use a graphite electrode in the form of a tube, for instance such as is disclosed in the attached drawing, into which, from end to end, one introduces cylinders of a heavy refractory until the apparent density, by test, is about 2.30.

For this purpose a commercial heavy refractory having a density, at room temperature, of about 3.5 may be used. Such a refractory has the composition

| | Percent |
|---|---|
| $ZrO_2$ | [1] 33 |
| $SiO_2$ | [1] 13 |
| $Fe_2O_3$ and/or $TiO_2$ | [1] 0.1 |
| $Na_2O$ | 1.6 |
| $Al_2O_3$ | 52.3 |

[1] (Approx.).

As the densities of glasses vary, so it will be necessary to adjust the density of the electrode to be about equal to that of the glass being made. The principle being known, and the density of graphite and refractory known, it is a simple matter which can be computed by the engineer or arrived at by flotation of the electrode in the glass bath itself.

In addition to the general principles, the invention includes certain novelties of electrode construction which contribute to perfection.

The drawing illustrates a composite electrode in vertical section.

In the drawing the furnace wall 10 is apertured at 11 for the reception of hollow, circular, mounting sleeve 12, which is supplied with a flow of cold water through conduits 13, and 14. The electrode 15 is mounted in the sleeve and projects into the molten glass 16, extending, in the example illustrated, almost completely across the furnace and projecting at its other end into the furnace room.

The electrode is composed of tubes 17, 18 of equal length which are plugged by graphite plugs 19, 20 at their exposed ends. The tubes are joined by a threaded cylinder 21 which is oppositely screw threaded at its ends to receive cooperating internal threads in the abutting ends of tubes 17, 18. Cylinder 21 and plug 20 are apertured at 22, 23 to provide for the relief of internal gas pressure.

Lengths of heavy refractory 24 having diameters a few millimeters less than that of the interior of the tubes are placed in the tubes between the cylinder and the plugs, so as to extend substantially the whole length except for a few millimeters of space to allow for expansion without generation of pressures, thus providing an altered apparent density which extends uniformly from end to end of the electrode.

The electrode may be connected to power in the usual way.

For the making of window glass one may use graphite of density about 1.55 to 1.7, which varies little with temperature, and zirconium oxide, alumina refractory of density 3.5 in the cold and 3.3 at 1500° C., the diameter of the interior space being about .45 and .60 of the diameter of the electrode, and the diameter of the heavy refractory pieces being only enough less to prevent generation of internal stresses by expansion. The combined length of the refractory pieces allows only about enough space to prevent generation of internal endwise pressures.

The advantages of the invention are in the accomplishment of the objects stated above.

As many apparently widely different embodiments of the present invention may be made without departing from the spirit and scope thereof, it is to be understood that the invention is not limited to the specific embodiments.

What is claimed is:

1. An electrode for a glass furnace comprising a tube of graphite, a plug of refractory material substantially filling the tube, the mean density per unit length of the graphite and refractory material being substantially equal to the density of molten glass melted in a furnace equipped with said electrode.

2. An electrode for a glass furnace comprising a tube of graphite having a closed end, the tube being internally subdivided, each subdivision containing a plurality of cylinders of refractory material of greater density than molten glass, the mean density of the graphite and refractory material being substantially constant per unit length of tube and substantially equal to the density of molten glass.

3. An electrode comprising a graphite tube, substantially impervious to molten glass, which is internally subdivided by a plug having a conduit connecting the separate parts of the bore, one end of the electrode having an apertured plug, the separate parts of the bore containing heavy refractory composed and arranged to establish a mean density per unit length of electrode substantially equal to the density of molten glass.

4. An electrode for a furnace for melting glass, comprising a tube of graphite, and plug means of refractory material substantially filling said tube throughout the length thereof, said tube and plug means having a mean density per unit length of said tube substantially equal to the predetermined density of the molten glass.

5. In an electrode for a furnace for melting glass of a predetermined density when molten, an elongated tubular casing of graphite closed at its ends to form a chamber therein and a refractory solid material disposed within and extending substantially throughout the length of said chamber, said material having a density greater than graphite such that the mean density per unit length of said casing and material is substantially constant and equal to said predetermined density of the molten glass.

6. In an electrode for a furnace for melting glass having a known density when molten, a tubular casing of graphite having a longitudinal axis of symmetry and of uniform internal and external cross section in planes normal to said axis, and a plurality of discrete plugs of solid refractory material disposed within and extending substantially throughout the length of said casing, said plugs being of uniform cross section in said planes and having a homogenous density per unit length along said axis such that the mean density per unit length of said casing and plugs is substantially constant and equal to said known density of molten glass.

7. The electrode of claim 6, said molten glass having a density of about 2.30 at 1500° C., said plugs having a density of about 3.5.

8. The electrode of claim 6, said refractory material having essentially the composition by weight:

| | Percent |
|---|---|
| $ZrO_2$ | 33 |
| $SiO_2$ | 13 |
| $Fe_2O_3$ or $TiO_2$ | 0.1 |
| $Na_2O$ | 1.6 |
| $Al_2O_3$ | 52.3 |

References Cited by the Examiner

UNITED STATES PATENTS

| | | | |
|---|---|---|---|
| 1,880,540 | 10/32 | Wadman | 13—6 |
| 2,693,498 | 11/54 | Penberthy | 13—6 X |

RICHARD M. WOOD, *Primary Examiner.*

JOSEPH V. TRUHE, *Examiner.*